(12) United States Patent
Ahn et al.

(10) Patent No.: US 9,403,440 B2
(45) Date of Patent: Aug. 2, 2016

(54) WIRELESS POWER TRANSMISSION AND RECEPTION SYSTEM

(71) Applicant: SAMSUNG ELECTRONICS CO., LTD., Suwon-si (KR)

(72) Inventors: Chi Hyung Ahn, Suwon-si (KR); Sang Wook Kwon, Seongnam-si (KR); Ki Young Kim, Yongin-si (KR); Nam Yun Kim, Seoul (KR); Dong Zo Kim, Yongin-si (KR); Bong Chul Kim, Seoul (KR); Yun Kwon Park, Dongducheon-si (KR); Jae Hyun Park, Yongon-si (KR); Keum Su Song, Seoul (KR); Young Ho Ryu, Yongin-si (KR); Byoung Hee Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 171 days.

(21) Appl. No.: 14/204,911

(22) Filed: Mar. 11, 2014

(65) Prior Publication Data
US 2014/0285139 A1    Sep. 25, 2014

(30) Foreign Application Priority Data

Mar. 20, 2013 (KR) .................. 10-2013-0029532

(51) Int. Cl.
*H02J 7/00* (2006.01)
*B60L 11/18* (2006.01)
*B60L 3/00* (2006.01)

(52) U.S. Cl.
CPC .............. *B60L 11/182* (2013.01); *B60L 3/003* (2013.01); *B60L 3/0023* (2013.01); *B60L 11/1824* (2013.01); *B60L 11/1833* (2013.01); *B60L 11/1846* (2013.01); *B60L 2200/26* (2013.01); *B60L 2210/10* (2013.01); *B60L 2210/30* (2013.01); *B60L 2210/40* (2013.01);
(Continued)

(58) Field of Classification Search
CPC .............. B60L 11/182; B60L 11/1824; B60L 11/1833; B60L 11/1838; B60L 11/1846; B60L 2200/26; B60L 2270/147; Y02T 10/7005; Y02T 10/7088; Y02T 90/122
USPC .......................................................... 320/108
See application file for complete search history.

(56) References Cited

U.S. PATENT DOCUMENTS 5,869,958 A * 2/1999 Gallop .................. G01R 27/28
324/618
6,313,722 B1 * 11/2001 Tsuzuki .............. H01P 1/20381
333/204

(Continued)

FOREIGN PATENT DOCUMENTS

JP      8-237890 A    9/1996
JP      9-215211 A    8/1997

(Continued)

*Primary Examiner* — Vuthe Siek
(74) *Attorney, Agent, or Firm* — NSIP Law

(57) ABSTRACT

A wireless charging station, an electric vehicle charged wirelessly, and a method of charging an electric vehicle are provided. A wireless charging station include a charging unit configured to transmit power wirelessly to an electric vehicle, using a source resonator installed in the charging station; and a driving unit configured to move a target resonator connected to the source resonator from a position at which the target resonator is mounted on the charging unit to an installation space of the electric vehicle, when the electric vehicle is disposed in a charging area of the charging station.

20 Claims, 18 Drawing Sheets

(52) U.S. Cl.
CPC ........ *B60L2240/36* (2013.01); *B60L 2240/527* (2013.01); *B60L 2240/529* (2013.01); *B60L 2250/16* (2013.01); *B60L 2270/147* (2013.01); *Y02T 10/7005* (2013.01); *Y02T 10/7072* (2013.01); *Y02T 10/7216* (2013.01); *Y02T 10/7241* (2013.01); *Y02T 90/121* (2013.01); *Y02T 90/122* (2013.01); *Y02T 90/125* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 30/14* (2013.01)

(56) References Cited

U.S. PATENT DOCUMENTS

| | | |
|---|---|---|
| 2004/0142733 A1 | 7/2004 | Parise |
| 2010/0117596 A1 | 5/2010 | Cook et al. |
| 2012/0056579 A1* | 3/2012 | Kim ................. H02J 5/005 320/108 |
| 2012/0074891 A1 | 3/2012 | Anderson et al. |
| 2012/0281547 A1* | 11/2012 | Kim ................. H04B 5/0031 370/242 |
| 2014/0142876 A1* | 5/2014 | John ................. H02J 5/005 702/60 |

FOREIGN PATENT DOCUMENTS

| | | |
|---|---|---|
| JP | 2010-226946 A | 10/2010 |
| JP | 2011-160515 A | 8/2011 |
| JP | 2011-193616 A | 9/2011 |
| JP | 2011-217452 A | 10/2011 |
| JP | 2012-85472 A | 4/2012 |
| KR | 10-2011-0018472 A | 2/2011 |
| KR | 10-1035454 B1 | 5/2011 |
| KR | 10-2011-0060207 A | 6/2011 |
| KR | 10-2011-0063240 A | 6/2011 |
| KR | 10-2012-0011130 A | 2/2012 |

* cited by examiner

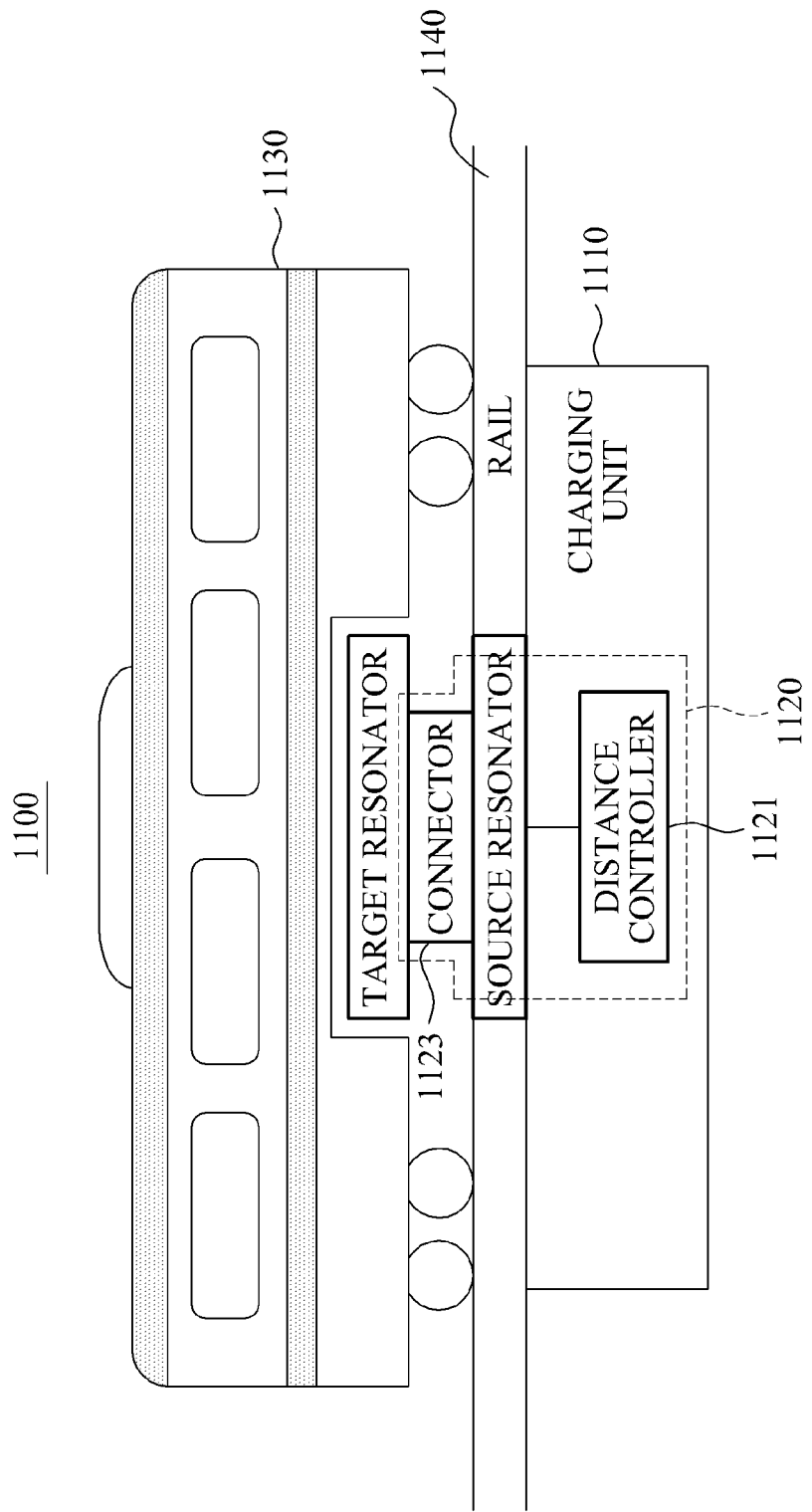

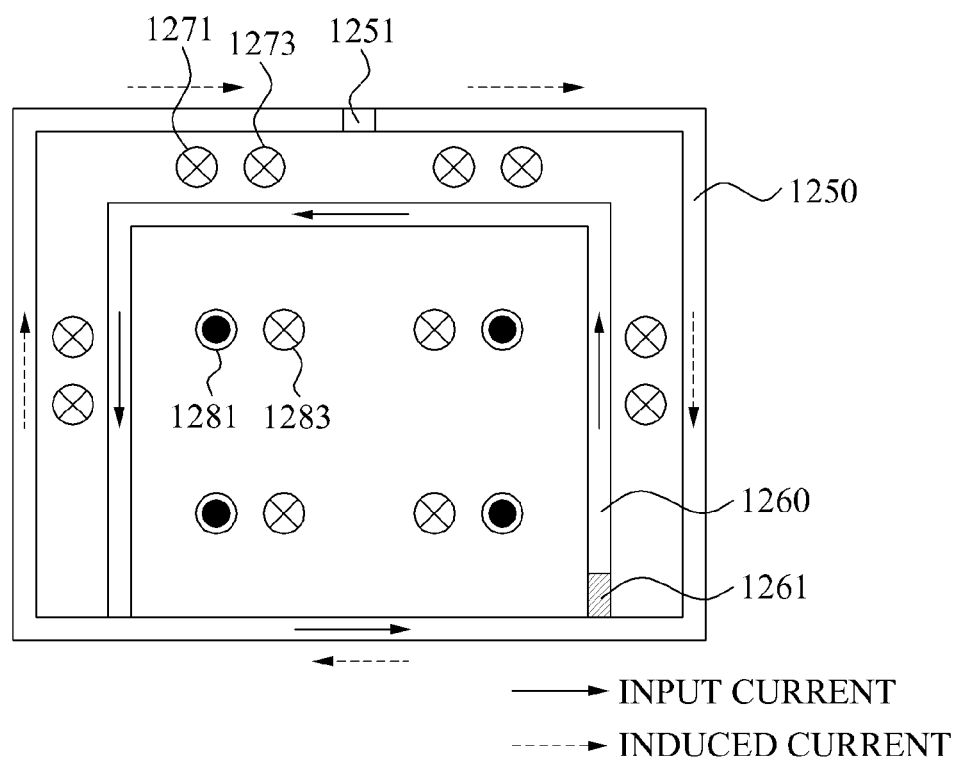

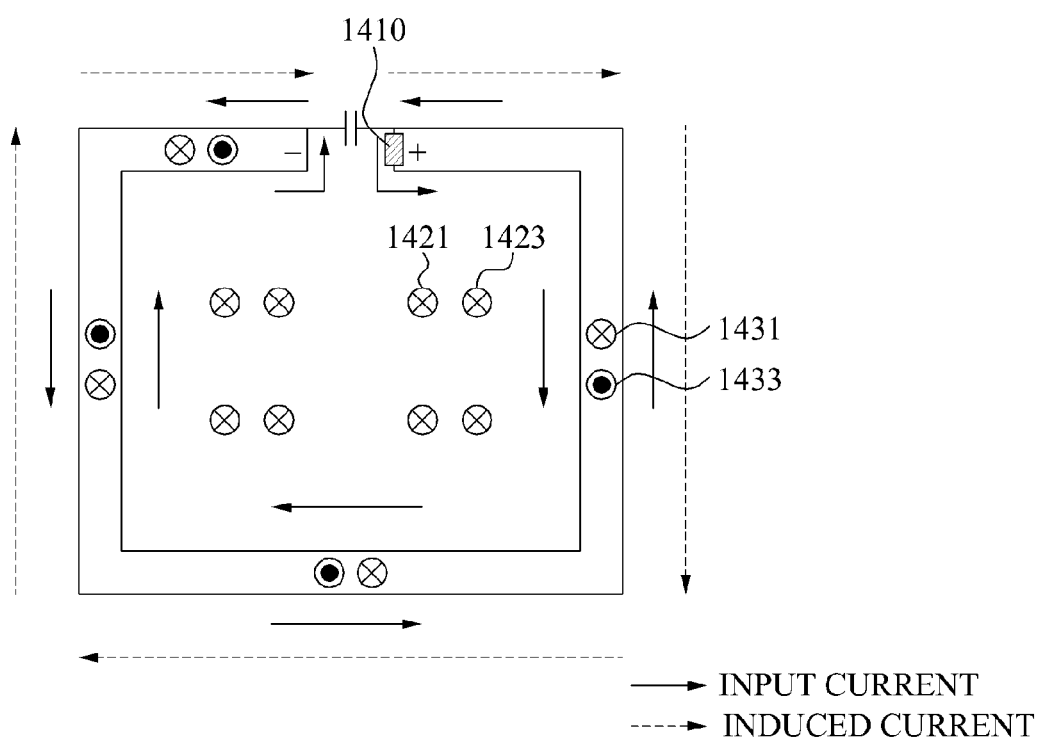

WIRELESS POWER TRANSMISSION AND RECEPTION SYSTEM

CROSS-REFERENCE TO RELATED APPLICATION(S)

This application claims the benefit under 35 USC 119(a) of Korean Patent Application No. 10-2013-0029532 filed on Mar. 20, 2013, in the Korean Intellectual Property Office, the entire disclosure of which is incorporated herein by reference for all purposes.

BACKGROUND

1. Field

The following description relates to a system for transmitting and receiving power wirelessly, to a wireless power charging station, and to a method of charging an electric vehicle.

2. Description of Related Art

The explosive increase in the use of electronic devices has spurred researches on wireless power transmission technology to address the inconveniences of providing wired power supplies to electronic devices, and to address the limited capacity of conventional batteries. Examples of electronic devices that may benefit from such technology includes electric vehicles, mobile devices, and the like. One of the wireless power transmission technologies under research focuses on using resonance characteristics of radio frequency (RF) devices in order to transmit power wirelessly.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a wireless power charging station, the charging station including: a charging unit configured to transmit power wirelessly to an electric vehicle, using a source resonator installed in the charging station; and a driving unit configured to move a target resonator connected to the source resonator from a position at which the target resonator is mounted on the charging unit to an installation space of the electric vehicle, when the electric vehicle is disposed in a charging area of the charging station.

The driving unit may include: a distance controller configured to control a physical distance between the source resonator and the target resonator; and a connector configured to connect the source resonator and the target resonator at a distance determined by the distance controller.

The connector may be formed by a ferrite core, and is provided in a shape of a hollow cylinder.

The distance controller may be configured to recognize a distance from the source resonator to the installation space of the electric vehicle, and control the physical distance between the source resonator and the target resonator based on the recognized distance.

The source resonator may include a superconductive material, and the charging unit may include a cooler configured to cool the source resonator in order to maintain a superconductive property of the source resonator.

The charging unit may include: an alternating current-to-direct current (AC/DC) converter configured to convert an AC voltage output from a power supply into a DC voltage; and an inverter configured to convert the converted DC voltage into an AC voltage, using the resonant frequency.

The driving unit may be configured to connect the source resonator to a portable target resonator mounted on a bottom surface of the electric vehicle at a position located more than a predetermined distance away from a front tire and a rear tire of the electric vehicle.

The driving unit may be configured to connect the source resonator to a portable target resonator mounted on at least one of an axis connecting front wheels of the electric vehicle and an axis connecting rear wheels of the electric vehicle.

The driving unit may be configured to connect the source resonator to a portable target resonator mounted on at least one of a front bumper and a rear bumper of the electric vehicle.

The source resonator may be mounted in a stand provided in a direction vertical to a platform for positioning the electric vehicle, and a height of the stand may allow the source resonator to be aligned with a portable target resonator mounted on the electric vehicle.

The charging unit may include the source resonator at a height greater than a height of the electric vehicle, and the source resonator may be configured to resonate with a portable target resonator mounted on a roof of the electric vehicle.

The source resonator may have a dual loop structure including an external loop and an internal loop.

In another general aspect, there is provided an electric vehicle configured to be charged in the above charging station, the electric vehicle including: a port unit configured to be electrically connected to the target resonator when the target resonator is disposed in the installation space; and a rectifier configured to convert an AC voltage induced in the target resonator into a DC voltage.

The general aspect of the electric vehicle may further include: a DC-to-DC (DC/DC) converter configured to convert an amplitude of the converted DC voltage into an amplitude of a DC voltage necessary for charging the battery of the electric vehicle.

In another general aspect, there is provided a wireless power charging station, the wireless power charging station including: a charging unit configured to transmit power wirelessly, through a source resonator installed on a rail, to a target resonator that mutually resonates with the source resonator at a resonant frequency of the source resonator; and a driving unit configured to move the target resonator connected to and supported by the source resonator from a position at which the target resonator is initially disposed in the charging station to an installation space of a railway vehicle, when the railway vehicle is disposed in a charging area of the charging station.

The driving unit may include: a distance controller configured to control a physical distance between the source resonator and the target resonator; and a connector configured to connect the source resonator and the target resonator at a distance determined based on a control of the distance controller.

In another general aspect, there is provided a method of charging an electric vehicle, the method including: determining whether an electric vehicle is disposed in a charging station using a sensor; positioning a source resonator or a target resonator based on a position of a power reception unit of the electric vehicle; and wirelessly transmitting power through the source resonator and the target resonator to charge an electric vehicle battery of the electric vehicle.

The target resonator may be a portable target resonator installed to a bottom surface of the electric vehicle. The electric vehicle may include an installation space via which the target resonator may receive power from the source resonator provided in the charging station.

The positioning of the source resonator or the target resonator may involve using a wheel stop to halt the electric vehicle in a charging area.

The wirelessly transmitting of power may be performed while the temperature of the source resonator is maintained under 80 Kelvin.

Other features and aspects will be apparent from the following detailed description, the drawings, and the claims.

BRIEF DESCRIPTION OF THE DRAWINGS

FIG. 11 is a diagram illustrating another example of a wireless power transmission and reception system.

FIG. 12B is a diagram illustrating distribution of a magnetic field in an example of a resonator.

FIG. 14A is a diagram illustrating distribution of a magnetic field within an example of a resonator based on feeding of a feeding unit.

Figure 1:
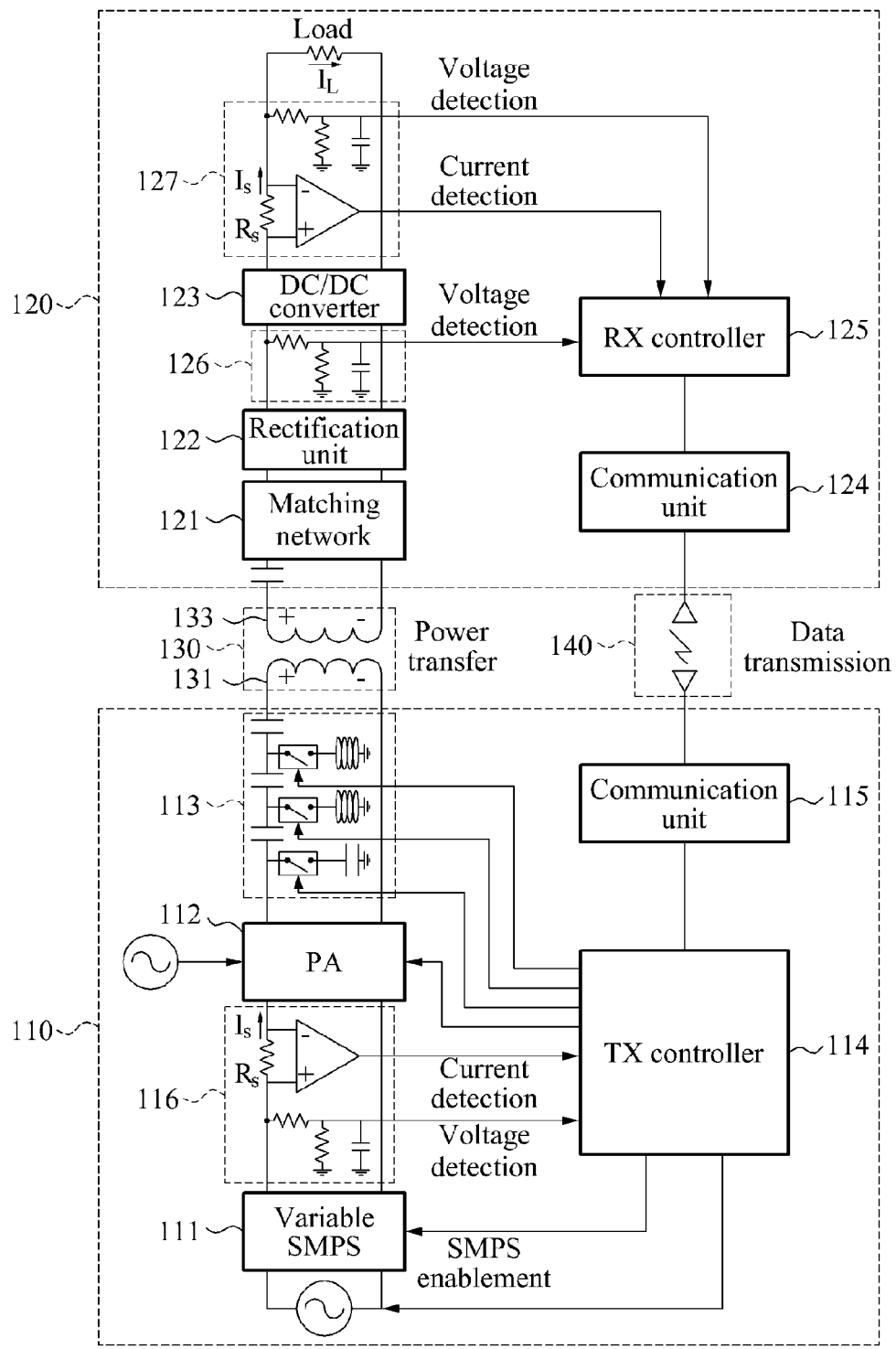
FIG. 1 is a diagram illustrating an example of a wireless power transmission and reception system.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

A wireless power transmission system may be implemented by utilizing resonance characteristics of radio frequency (RF) devices. Such a wireless power transmission system may include a source that is configured to supply power, and a target that is configured to receive the power supplied by the source.

FIG. 1 illustrates an example of a wireless power transmission and reception system.

Referring to FIG. 1, the wireless power transmission and reception system includes a source 110 and a target 120. The source 110 may refer to a device that is configured to supply power wirelessly, and may include all electronic devices enabling power supply. The source 110 may be implemented as, for example, a pad, a terminal, a television (TV), a medical device, an electric vehicle, and the like. The target 120 may refer to a device that is configured to receive the power supplied wirelessly from the source 110. The target 120 may include all electronic devices requiring power such as, for example, a pad, a terminal, a tablet personal computer (PC), a medical device, an electric vehicle, and the like.

Referring to FIG. 1, the source 110 includes a variable switching mode power supply (SMPS) 111, a power amplifier (PA) 112, a matching network 113, a transmission (TX) controller 114 (for example, a TX control logic), and a communication unit 115.

The variable SMPS 111 may generate direct current (DC) voltage by switching alternating current (AC) voltage in a range of tens of hertz (Hz) output from a power supply. The variable SMPS 111 may output DC voltage of a predetermined level, or may adjust an output level of DC voltage based on the control of the TX controller 114.

The variable SMPS 111 may control supplied voltage based on a level of power output from the PA 112 so that the PA 112 may operate in a saturation region with high efficiency at all times, and may maintain a maximum efficiency at all levels of desired output power. In one example, the PA 112 may be a class-E power amplifier, or may exhibit features of a class-E amplifier.

In the event that a common SMPS is used instead of the variable SMPS 111, a variable DC-to-DC (DC/DC) converter is additionally used. In this example, the common SMPS and the variable DC/DC converter may control supplied voltage based on the level of the power output from the PA 112 so that the PA 112 may operate in the saturation region with high efficiency at all times, and may maintain the maximum efficiency at all levels of output power.

A power detector 116 may detect output current and output voltage of the variable SMPS 111, and may transfer to the TX controller 114 information regarding the detected current and the detected voltage. Additionally, the power detector 116 may detect input current and input voltage of the PA 112.

The PA 112 may generate power by converting DC voltage of a predetermined level to AC voltage, using a switching pulse signal in a band in a range of a few megahertz (MHz) to tens of MHz. Accordingly, the PA 112 may convert DC voltage supplied to the PA 112 to AC voltage, using a reference resonant frequency $F_{Ref}$, and may generate communication power used for communication, or charging power used for charging the target 120. The communication power and the charging power may be send to and used in a plurality of target devices.

When a large amount of power corresponding to a few kilowatts (kW) to tens of kW is transmitted using a resonant frequency in a range of tens of kilohertz (kHz) to hundreds of kHz, the PA 112 may not be used. Alternatively, power may be transferred to a source resonator 131 from the variable SMPS 111 or a high-power power supply. For example, an inverter may be used in lieu of the PA 112. The inverter may convert a DC power supplied from the high-power power supply into an AC power. The inverter may convert the power, by converting a DC voltage of a predetermined level into an AC voltage, using a switching pulse signal in a range of tens of kHz to hundreds of kHz. For example, the inverter may convert the DC voltage of the predetermined level into the AC voltage, using a resonant frequency in a range of tens of kHz to hundreds of kHz of the source resonator 131.

The term "communication power" may refer to low power suitable for communication purposes that corresponds to frequency in a range of 0.1 milliwatt (mW) to 1 mW. The term "charging power" may refer to high power in a range of a few mW to tens of kW that may be consumed in a device load of a target device. In various examples described herein, the term "charging" may refer to supplying power to a unit or element that is configured to store power for subsequent consumption. The term "charging" may also refer to supplying power to a unit or element that is configured to consume power. The units or elements that may be charged include, for example, batteries, displays, sound output circuits, main processors, various sensors and the like.

The term "reference resonant frequency" may refer to a resonant frequency that is used by the source 110. The term "tracking frequency" may refer to a resonant frequency that is adjusted by a preset scheme.

The TX controller 114 may be configured to detect a reflected wave of the communication power or the charging power, and may be configured to detect a mismatching that may occur between a target resonator 133 and the source resonator 131 based on the detected reflected wave. To detect the mismatching between a source resonator 131 and a target resonator 133, the TX controller 114 may, for example, detect an envelope of the reflected wave, a power amount of the reflected wave, and the like.

Under the control of the TX controller 114, the matching network 113 may compensate for impedance mismatching between the source resonator 131 and the target resonator 133 in order to optimize the matching between the source resonator 131 and the target resonator 133. Referring to FIG. 1, the matching network 113 may be connected through a switch, based on a combination of a capacitor and an inductor, which are under the control of the TX controller 114.

When a large amount of power is to be transmitted using a resonant frequency in a range of tens of kHz to hundreds of kHz, the configuration of the matching network 113 may be omitted from the source 110 because an effect of the matching network 113 may be reduced when the amount of power that is transmitted is large.

The TX controller 114 may compute a voltage standing wave ratio (VSWR), based on a voltage level of the reflected wave, and on a level of an output voltage of the source resonator 131 or the PA 112. In the event that the VSWR is greater than a predetermined value, the TX controller 114 may determine that a mismatching has occurred.

In another example, in the event that the VSWR is determined to be greater than the predetermined value, the TX controller 114 may compute a power transmission efficiency for each of N tracking frequencies, and may determine a tracking frequency $F_{Best}$ with the best power transmission efficiency among the N tracking frequencies. Based on the result, the TX controller 114 may adjust the reference resonant frequency $F_{Ref}$ to the tracking frequency $F_{Best}$. In various examples, the N tracking frequencies may be set in advance.

The TX controller 114 may adjust a frequency of a switching pulse signal. The frequency of the switching pulse signal may be determined by the TX controller 114. For example, by controlling the PA 112, the TX controller 114 may generate a modulation signal that may be transmitted to the target 120. For example, the communication unit 115 may transmit a variety of data 140 to the target 120 using an in-band communication. The TX controller 114 may detect a reflected wave, and may demodulate a signal received from the target 120 through an envelope of the detected reflected wave.

The TX controller 114 may generate a modulation signal for in-band communication, using various methods. For example, the TX controller 114 may generate the modulation signal by turning on or off a switching pulse signal, by performing delta-sigma modulation, and the like. The TX controller 114 may also generate a pulse-width modulation (PWM) signal with a predetermined envelope.

The TX controller 114 may determine initial wireless power that is to be transmitted to the target 120. The TX controller 114 may determine the initial wireless power to be transmitted based on: a change in a temperature of the source 110, a battery state of the target 120, a change in an amount of power received at the target 120, and/or a change in a temperature of the target 120.

The source 110 may further include a temperature measurement sensor (not illustrated) that is configured to detect a change in temperature of the source 110. The source 110 may receive, from the target 120, information regarding the battery state of the target 120, the change in the amount of power received at the target 120, and/or the change in the temperature of the target 120, by communicating with the target 120.

The change in the temperature of the target 120 may be detected based on data received from the target 120.

The TX controller 114 may adjust voltage supplied to the PA 112, using a lookup table. The lookup table may be used to store an amount of the voltage to be adjusted based on the change in the temperature of the source 110. For example, in response to determining that the temperature of the source 110 increased, the TX controller 114 may lower the amount of the voltage to be supplied to the PA 112 based on the lookup table.

The communication unit 115 may perform an out-band communication that employs a communication channel. The communication unit 115 may include a communication module, such as one configured to process ZigBee, Bluetooth, and the like. The communication unit 115 may transmit data 140 to the target 120 through an out-band communication.

The source resonator 131 may transfer an electromagnetic energy 130 to the target resonator 133. For example, the source resonator 131 may transfer the communication power or charging power to the target 120, using magnetic coupling with the target resonator 133. The source resonator 131 may include a superconductive material. In addition, although not illustrated in FIG. 1, the source resonator 131 may be disposed in a container including a refrigerant so as to maintain a superconductive property of the source resonator 131. A heated refrigerant may be liquefied from a gaseous state to a liquid state by a cooler. In another example, the target resonator 133 may include a superconductive material. In this instance, the target resonator 133 may be disposed in a container including a refrigerant so as to maintain a superconductive property of the target resonator 133.

As illustrated in FIG. 1, the target 120 includes a matching network 121, a rectification unit 122, a DC/DC converter 123, a communication unit 124, and a reception (RX) controller 125. The reception controller 125 may be, for example, an RX control logic.

The target resonator 133 may receive electromagnetic energy 130 from the source resonator 131. For example, the target resonator 133 may receive communication power or charging power from the source 110, using magnetic coupling with the source resonator 131. Additionally, the target resonator 133 may receive the data 140 from the source 110 using an in-band communication.

The target resonator 133 may receive the initial wireless power of magnitude that is determined based on the change in the temperature of the source 110, the battery state of the target 120, the change in the amount of power received at the target 120, and/or the change in the temperature of the target 120.

The matching network 121 may match an input impedance viewed from the source 110 to an output impedance viewed from a load. The matching network 121 may be configured with a combination of a capacitor and an inductor.

The rectification unit 122 may generate DC voltage by rectifying AC voltage. The AC voltage may be received from the target resonator 133.

The DC/DC converter 123 may adjust a level of the DC voltage that is output from the rectification unit 122, based on a capacity required by the load. For example, the DC/DC converter 123 may adjust the level of the DC voltage output from the rectification unit 122 from 3 volts (V) to 10 V.

The power detector 127 may detect voltage of an input terminal 126 of the DC/DC converter 123, and current and voltage of an output terminal of the DC/DC converter 123. The detected voltage of the input terminal 126 may be used to compute a transmission efficiency of power received from the source 110. The detected current and the detected voltage of the output terminal may be also used by the RX controller 125 to compute an amount of power transferred to the load. The TX controller 114 of the source 110 may determine an amount of power that needs to be transmitted by the source 110, based on power required by the load and the power transferred to the load.

When the amount of power of the output terminal computed using the communication unit 124 is transferred to the source 110, the source 110 may compute an amount of power that needs to be transmitted.

The communication unit 124 may perform an in-band communication to transmit or receive data using a resonance frequency. During the in-band communication, the RX controller 125 may demodulate a received signal by detecting a signal between the target resonator 133 and the rectification unit 122, or detecting an output signal of the rectification unit 122. For example, the RX controller 125 may demodulate a message received using an in-band communication. The RX controller 125 may also adjust an impedance of the target resonator 133 using the matching network 121, to modulate a signal to be transmitted to the source 110. For example, the RX controller 125 may increase the impedance of the target resonator 133, so that a reflected wave may be detected from the TX controller 114 of the source 110. Depending on whether the reflected wave is detected, the TX controller 114 may detect a first value, for example a binary number "0," or a second value, for example a binary number "1."

The communication unit 124 may transmit a response message to the communication unit 115 of the source 110. For example, the response message may include one or more of: a type of a corresponding target, information about a manufacturer of the corresponding target, a model name of the corresponding target, a battery type of the corresponding target, a scheme of charging the corresponding target, an impedance value of a load of the corresponding target, information on characteristics of a target resonator of the corresponding target, information on a frequency band used by the corresponding target, an amount of a power consumed by the corresponding target," an "identifier (ID) of the corresponding target," "information on version or standard of the corresponding target," and the like.

The communication unit 124 may perform an out-band communication that utilizes a separate communication channel. For example, the communication unit 124 may include a communication module, such as one configured to process ZigBee, Bluetooth, and the like. The communication unit 124 may transmit or receive data 140 to or from the source 110 using the out-band communication.

The communication unit 124 may receive a wake-up request message from the source 110, and the power detector 127 may detect an amount of power received to the target resonator 133. The communication unit 124 may transmit, to the source 110, information on the detected amount of the power. Information on the detected amount may include, for example, an input voltage value and an input current value of the rectification unit 122, an output voltage value and an output current value of the rectification unit 122, an output voltage value and an output current value of the DC/DC converter 123, and the like.

Figure 2:
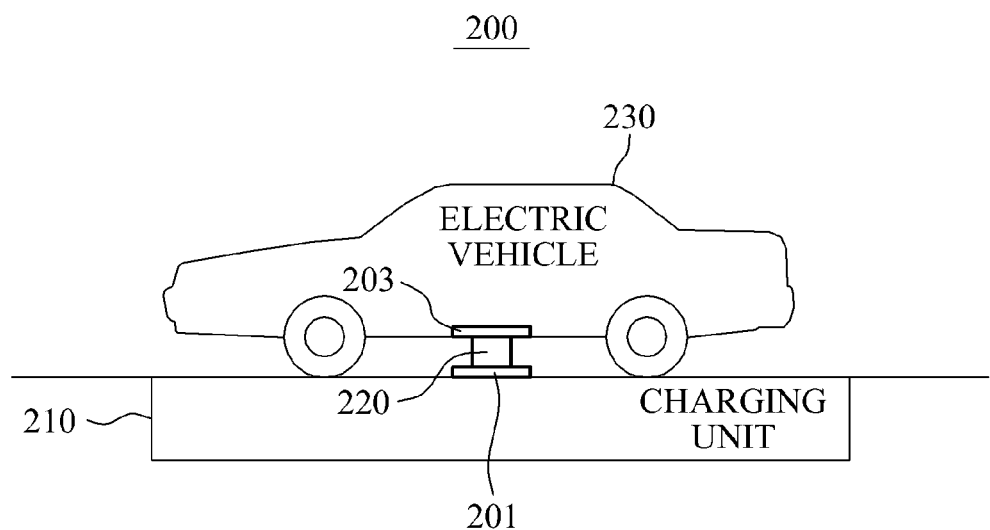
FIG. 2 is a diagram illustrating another example of a wireless power transmission and reception system.

FIG. 2 illustrates another example of a wireless power transmission and reception system 200.

Referring to FIG. 2, the system 200 includes an electric vehicle 230 and a charging station that includes a charging unit 210 and a driving unit 220. The driving unit 220 may include, for example, an actuator.

The charging unit 210 may transmit power wirelessly, through a source resonator 201 installed in the charging unit 210, to a target resonator 203 that mutually resonates with the source resonator 201 at a resonant frequency of the source resonator 201. The charging unit 210 may refer to an area in which the electric vehicle 230 may be charged. A predetermined space, for example, a gas station, may be set as a charge station for an electric vehicle that has a charging unit 210. The charging unit 210 may supply power to the source resonator 201. In FIG. 2, the source resonator 201 is disposed on an upper portion of the charging unit 210. However, as another example, the source resonator 201 may be included in an internal portion of the charging unit 210.

The driving unit 220 may move the target resonator 203 to an installation space of the electric vehicle 230 when the electric vehicle 230 is disposed in a charging area of the charging unit 210. By adjusting the position of the electric vehicle 230, a better alignment or positioning of the source resonator 201 and the target resonator 203 may be obtained for effective and safe charging of the electric vehicle 230. The electric vehicle 230 may be designed to have a space for installing the target resonator 203. The charging area may be defined as an area in which power may be transferred from the source resonator 201 mounted on or installed in the charging unit 210.

The driving unit 220 may move the target resonator 203 from a position at which the target resonator 203 is mounted on the charging unit 210 to the installation space of the to electric vehicle 230.

For example, the driving unit 220 may connect the source resonator 201 and the target resonator 203, and support the connection between the source resonator 201 and the target resonator 203.

The driving unit 220 may, for example, adjust a height of the driving unit 220, thereby adjusting a distance between the source resonator 201 and the target resonator 203. The height of the driving unit 220 may be adjusted based on a distance between the charging unit 210 and a bottom surface of the electric vehicle 230. In this example, allowances may be made for a size of the source resonator 201 and a size of the target resonator 203.

The height of the driving unit 220 configured to connect the source resonator 201 and the target resonator 203 may be fixed. A structure that connects the source resonator 201, the driving unit 220, and the target resonator 203 to each other may be mounted on the charging unit 210. When the electric vehicle 230 is disposed in the charging area of the charging station, the structure may be moved or repositioned with respect to the electric vehicle 230 such that the source resonator 201 is disposed below the installation space of the target resonator 203 in the electric vehicle 230. For example, when a force is applied to a bar connected to the driving unit 220 in a vertical direction using the principle of a lever, the structure may be repositioned in a direction opposite to the direction in which the force is applied with respect to the electric vehicle 230.

The electric vehicle 230 may be charged using power received by the target resonator 203 when the target resonator 203 is disposed in the installation space of the electric vehicle 230. For example, the electric vehicle 230 may include a battery (not shown). The battery may store power by receiving the power received by the target resonator 203.

For example, in the event that the target resonator 203 is not mounted in the electric vehicle 230, the target resonator 203 installed in the charging unit 210 may be mounted in the installation space of the electric vehicle 230, automatically or manually. The target resonator 203 may be disposed on an upper portion of the source resonator 201 or an upper portion of the driving unit 220.

The driving unit 220 may connect and support the source resonator 201 and the target resonator 203. The driving unit 220 may be provided in a form of a hollow cylinder, or in a form identical to forms of the source resonator 201 and the target resonator 203. The driving unit 220 may include a material that helps a magnetic field passing between the source resonator 201 and the target resonator 203. For example, a ferrite core may be used.

Figure 3:
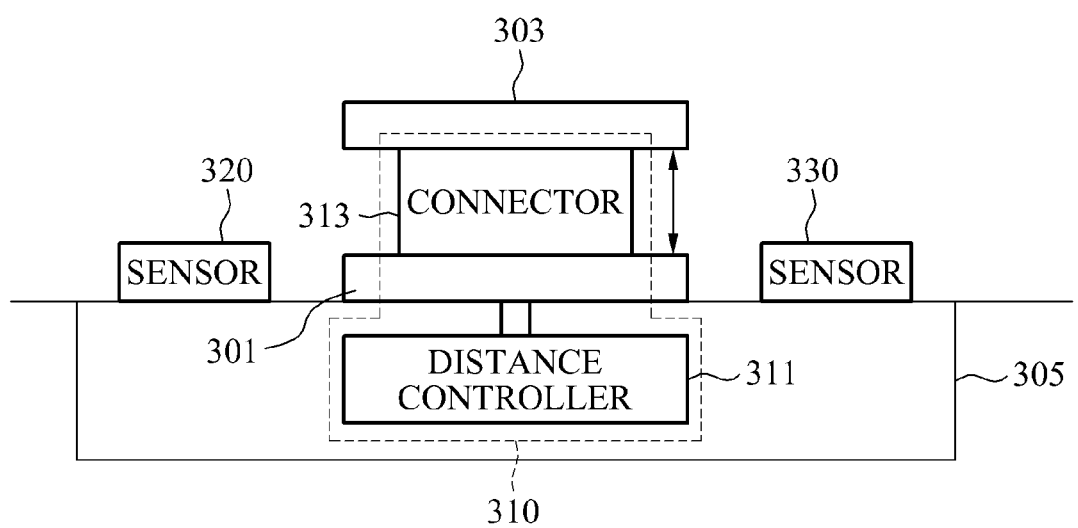
FIG. 3 is a diagram illustrating an example of a driving unit of a wireless power transmission and reception system.

FIG. 3 illustrates an example of a driving unit 310 of a wireless power transmission and reception system in detail.

Referring to FIG. 3, the driving unit 310 includes a distance controller 311, and a connector 313.

The distance controller 311 may control a physical distance between a source resonator 301 and a target resonator 303. The distance controller 311 may control a height of the connector 313. When an electric vehicle enters a charging station, the distance controller 311 may recognize a distance between the electric vehicle and the charging unit 305, using at least one of a plurality of sensors 320, 330 that are disposed in the charging station. The distance controller 311 may control the physical distance between the source resonator 301 and the target resonator 303, based on the recognized distance.

When the electric vehicle is disposed in a charging area of the charging unit 305, the distance controller 311 may recognize a distance from the source resonator 301 to an installation space of the electric vehicle, using at least one of the sensor 320 and the sensor 330. Based on the recognized distance between the source resonator 301 and the installation space of the electric vehicle, the distance controller 311 may control the physical distance between the source resonator 301 and the target resonator 303.

The connector 313 may connect the source resonator 301 and the target resonator 303 to each other, at a distance determined based on a control of the distance controller 311. The height of the connector 313 may be controlled based on the control of the distance controller 311. The height of the connector 313 may increase or decrease based on a height of a space in which the target resonator 303 is to be mounted in the electric vehicle.

For example, the connector 313 may be formed by a ferrite core, and may be provided in a form of a hollow cylinder.

Figure 4:
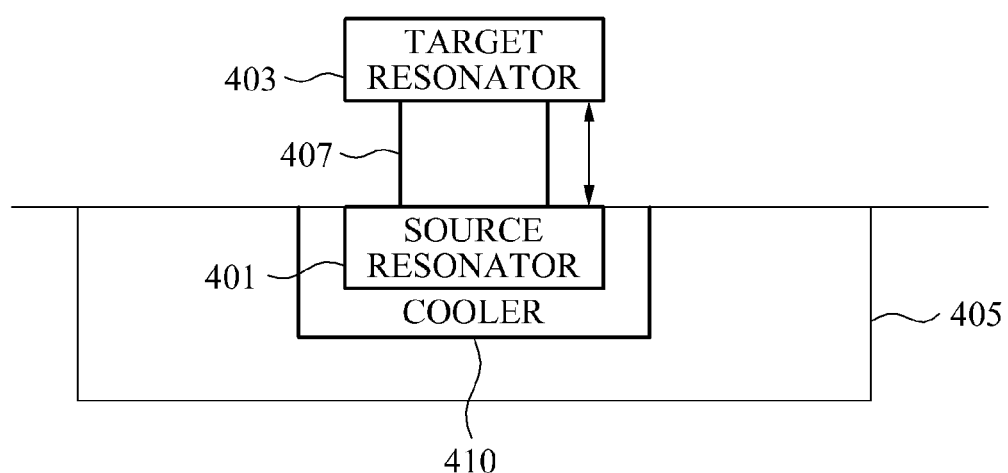
FIG. 4 is a diagram illustrating an example of a wireless power transmission and reception system.

FIG. 4 illustrates another example of a wireless power transmission and reception system.

Referring to FIG. 4, a source resonator 401 may include a superconductive material and have a relatively high quality factor such that the source resonator 401 may transmit power to a target resonator 403 at a high efficiency. In this instance, a charging unit 405 may include a cooler 410 configured to cool the source resonator 401 in order to maintain a superconductive property of the source resonator 401. The source resonator 401 and the target resonator 403 may be connected by a driving unit 407, and a distance between the source resonator 401 and the target resonator 403 may be adjusted.

A superconductive material may have a zero electrical resistance and thus, have an extremely high quality factor. When a quality factor is high, a wireless power transmission efficiency of the source resonator 401 may increase, and a distance the source resonator 401 may transmit power through a mutual resonance may increase.

A high-temperature superconductor (HTS) or a room temperature superconductor may be used as the superconductive material.

With a source resonator 401 that includes a high-temperature superconductive material, when the temperature of the source resonator 401 is maintained close to an absolute temperature of 77 Kelvin (K), it is possible to maintain a superconductive property of the source resonator 401. Accordingly, the temperature of the source resonator 401 may be maintained close to the absolute temperature of 77 K, through the cooler 410. For example, the cooler 410 may keep the temperature of the source resonator 401 to 80 K or less during wireless power transmission.

When the source resonator 401 includes a room temperature superconductive material, a superconductive property of the source resonator 401 may be maintained at room temperature. For example, the temperature of the source resonator 401 may be maintained to 25° Celsius (C) or less, or to 30° C. or less during wireless power transmission. Accordingly, the source resonator 401 may have a relatively high quality factor although the cooler 410 is absent.

The HTS having a complete conductivity may prevent a voltage drop, and may not be affected by an external magnetic field since penetration of the external magnetic field may be restrained due to a perfect diamagnetism. In addition, the HTS may not generate a magnetic field.

A container including a refrigerant may be provided for cooling of the HTS. As the refrigerant, cryogenic refrigerants, for example, liquid nitrogen, liquid neon, and the like, may be used. The container may include a liquid nitrogen storage tank, a cooling unit that is configured to cool a heated refrigerant, and the like.

For example, the cooling unit may be used for re-condensation of a refrigerant evaporated in a storage tank. The cooling unit may include a normally closed loop, in which an a working fluid such as, for example, helium gas, may be compressed by a compressor, and expanded by a cooling channel or pipe, whereby a cooling power may be supplied to a refrigerant existing in the storage tank. The cooling unit may operate according to, for example, the Gifford McMahon principle, a pulse tube principle, or the Stirling principle.

The Joule-Thomson effect may be applied to the container. The Joule-Thomson effect describes that the temperature decreases during expansion of a liquid refrigerant flowing from a high pressure area to a low pressure area. In this example, a pressure of an inlet line is set to be higher than a pressure of an outlet line.

In maintenance of the container, liquid nitrogen may be replaced with a separate liquid nitrogen tank to enable simple repairs of the container.

Since the HTS may have a zero electric resistance, lossless power transmission may be possible and thus, a voltage drop may be prevented.

Coated conductors, also referred to as second generation superconductors, may have long lengths, and the lengths may be determined, for example, based on a level requested when a resonator is manufactured.

A coated conductor may include a substrate to which a multi-layer structure including an HTS layer is applied, and at least one buffer layer disposed between the substrate and the HTS layer. The at least one buffer layer may be manufactured using a ceramic material that has a relatively high resistance. The ceramic material may be a dielectric material. The at least one buffer layer may work to compensate for various different properties of materials to be used. For example, the at least one buffer layer may be provided to prevent the HTS layer from being contaminated with components of the substrate that may disperse toward the HTS layer.

As the high-temperature superconductive material, a ceramic oxide high-temperature superconductive material or magnesium diboride ($MgB_2$) may be used. The ceramic oxide high-temperature superconductive material may be one of bismuth-based, thallium-based, yttrium-based, and mercury-based ceramic oxide superconductors.

Examples of suitable HTS materials include ceramic oxide HTS materials based on Bi-Ae-Cu-Oy, (Bi, Pb)-Ae-Cu-Oy, Re-Ae-Cu-Oy, (Tl, Pb)-Ae-Cu-O, or Hg-Ae-Cu-Oy. In the preceding formulae, y denotes a relative oxygen content in a range appropriate for a predetermined superconductive material, Ae denotes at least one alkaline earth element, in particular, barium (Ba), calcium (Ca), and/or strontium (Sr), and Re denotes at least one rare earth element, in particular, yttrium (Y), or a combination of at least two of Y, lanthanum (La), lutetium (Lu), scandium (Sc), cerium (Ce), neodymium (Nd), and ytterbium (Yb). However, the material for the HTS layer is not limited thereto.

Alternatively, precursors of the superconductive materials may be used. The precursors may refer to compounds of oxides collectively including the same nominal composition as the superconductive material, and may form a superconductive material when heated.

In addition, the ceramic oxide HTSs may include HTSs known by references of bismuth strontium calcium copper oxide (BSCCO)-2212 and BSCCO-2223, and HTSs known by references of yttrium barium copper oxide (YBCO)-123 and YBCO-211. In this example, the numerical combinations 2212 and 2223 denote stoichiometric ratios of elements Bi, Sr, Ca, and copper (Cu). The portion of Bi may be substituted by lead (Pb). The numerical combinations 123 and 211 denote stoichiometric ratios of elements Y, Ba, and Cu.

The ceramic oxide superconductive material may correspond to a rare earth barium cuprate type-superconductor of the formula ReBaCuOy. Here, Re and y may be defined as described above.

The room temperature superconductor refers to a material that operates as a superconductor at room temperature. Such a material may be generated by a method of injecting high-density electrons into a graphite powder. For example, by mixing graphite powder with a length of tens of micrometers and a thickness of tens of nanometers with distilled water, and drying the mixture at 100 degrees Celsius, a gap between a piece of graphite and a neighboring piece of graphite may be filled with high-density electrons, and consequently, a room temperature superconductor may be generated.

For example, the target resonator 403 may include a superconductive material. A superconductive material may have a zero electrical resistance and thus, may have an extremely high quality factor. When a quality factor is high, a high wireless power transmission efficiency of the target resonator 403 may be obtained, and a distance the target resonator 403 may transmit power through a mutual resonance may be increased.

Figure 5:
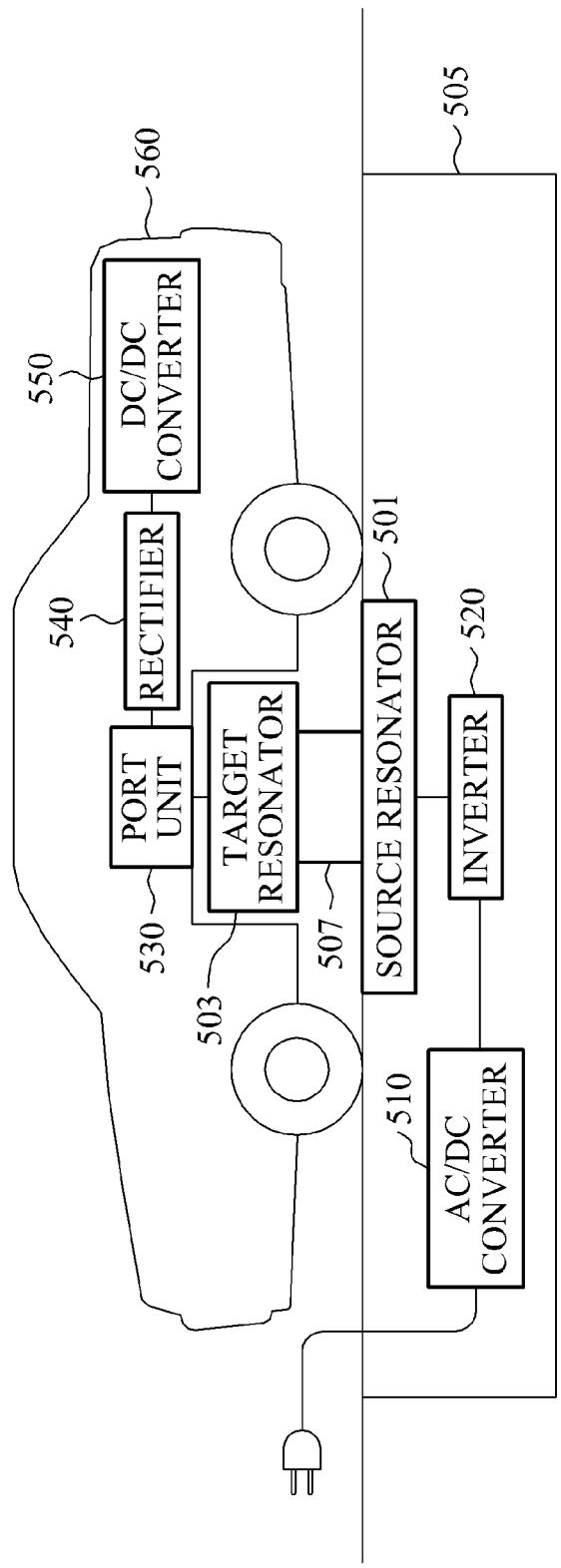
FIG. 5 is a diagram illustrating another example of a wireless power transmission and reception system.

FIG. 5 illustrates still another example of a wireless power transmission and reception system.

Referring to FIG. 5, a charging unit 505 includes an AC-to-DC (AC/DC) converter 510, and an inverter 520. The AC/DC converter 510 may convert an AC voltage output from a power supply into a DC voltage, and the inverter 520 may convert the DC voltage converted by the AC/DC converter 510 into an AC voltage using a resonant frequency of a source resonator 501. For example, the power supply may supply a great amount of power in a wired manner. When an electric vehicle 560 enters a charging station having the charging unit 505 installed therein and is positioned in a charging area of the charging station, a target resonator 503 may be moved to an installation space of the electric vehicle 560, based on a control of a driving unit 507 of the charging station.

The electric vehicle 560 includes a port unit 530, a rectifier 540, and a DC/DC converter 550. The port unit 530 may be electrically connected to the target resonator 503 when the target resonator 503 is disposed in the installation space of the electric vehicle 560. The rectifier 540 may convert an AC voltage induced in the target resonator 503 into a DC voltage. The DC/DC converter 550 may convert an amplitude of the DC voltage converted by the rectifier 540 into an amplitude of a DC voltage necessary for charging a battery of the electric vehicle 560.

FIGS. 6 through 10 illustrate various examples of source resonators and target resonators in wireless power transmission and reception systems.

Figure 6:
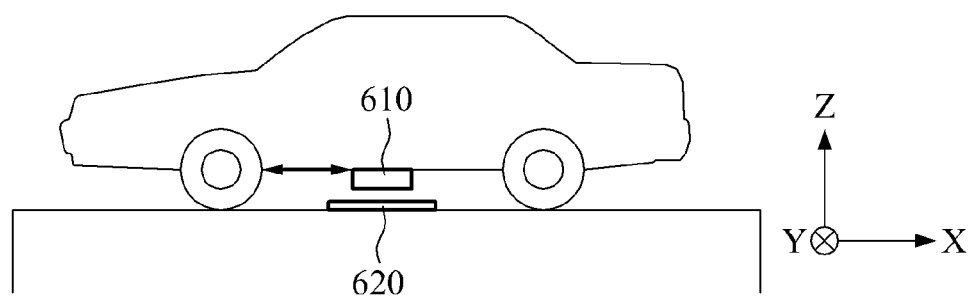
FIGS. 6 through 10 are diagrams illustrating various examples of source resonators and target resonators in a wireless power transmission and reception system.

Referring to FIG. 6, a portable target resonator 610 may be disposed on a bottom surface of an electric vehicle. The components described with reference to FIG. 5 may be included in an internal portion of the electric vehicle. The electric vehicle may be charged on a charging station. A predetermined space, for example, a gas station, may be set as a charging area using resonance. The charging station may include a charging unit that includes a source resonator 620 disposed on a bottom platform. When the electric vehicle is moved such that the portable target resonator 610 is aligned with the source resonator 620, the source resonator 620 may mutually resonate with the portable target resonator 610 to transmit power stored in the source resonator 620. The source resonator 620 may include a superconductive material. In this example, the charging station may further include a cooler. The cooler may cool the source resonator 620 through a refrigerant in order to maintain a superconductive property of the source resonator 620.

The portable target resonator 610 may be mounted on the bottom surface of the electric vehicle at a position located more than a predetermined distance away from a front tire and a rear tire of the electric vehicle.

For example, the portable target resonator 610 may be disposed at a center of the bottom surface of the electric vehicle, or at a position spaced more than 10 cm from the front tire or the rear tire. The portable target resonator 610 may be disposed in the middle of the bottom surface, corresponding to an X axis, of a body of the electric vehicle. For efficient wireless power transmission, a distance between the source resonator 620 and the portable target resonator 610, an alignment on X and Y axes, and the like may be determined based on a size of the source resonator 620, a size of the portable target resonator 610, a frequency, and the like.

Figure 7:
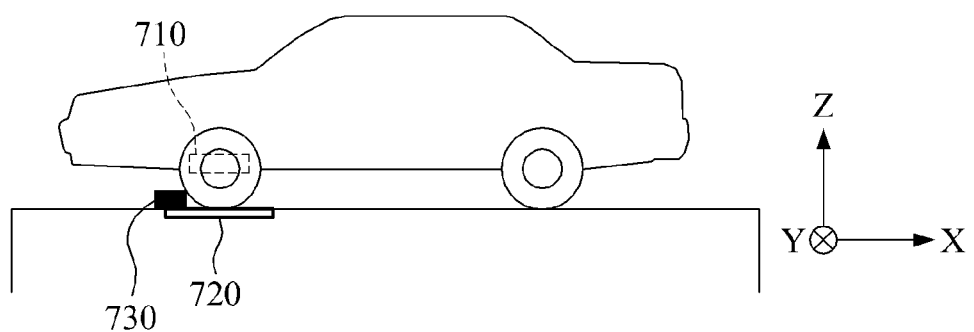

Referring to FIG. 7, a portable target resonator 710 may be mounted on at least one of an axis connecting front wheels of an electric vehicle and an axis connecting rear wheels of the electric vehicle. A source resonator 720 may be installed in an internal portion of a charging unit. A wheel stop 730 for the electric vehicle may be disposed on the charging unit, and a position of the source resonator 720 may be determined based on a position of the wheel stop 730.

The portable target resonator 710 may be disposed on an axis identical to the axis of the wheels of the electric vehicle, for example, in an X-axial direction. The portable target resonator 710 may be disposed in the middle of a body of the electric vehicle, or toward one side, for example, in a Y-axial direction. For efficient wireless power transmission, a distance between the source resonator 720 and the portable target resonator 710, an alignment on X and Y axes, and the like may be determined based on a size of the source resonator 720, a size of the portable target resonator 710, a frequency, and the like.

Figure 8:
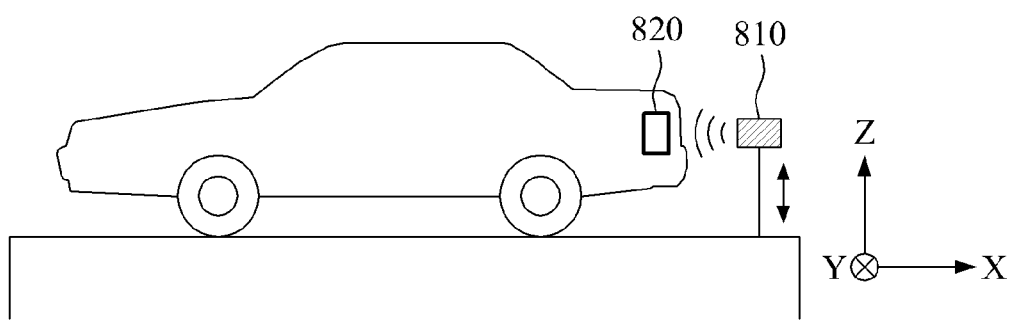

Referring to FIG. 8, an electric vehicle includes a portable target resonator 820 mounted on a rear bumper of the electric vehicle. A source resonator may be mounted in a stand 810 provided in a direction vertical to a bottom platform of a charging unit. A height of the stand 810 may be adjusted for the source resonator to be aligned with the portable target resonator 820. Since a position of the portable target resonator 820 may differ based on a type of the electric vehicle, a position of the stand 810 may be adjusted for the source resonator to be aligned with the portable target resonator 820.

The portable target resonator 820 may be disposed on one of inner, upper, lower, and surfaces of the rear bumper of the electric vehicle. For example, the portable target resonator 820 may be installed within 20 cm from the rear bumper of the electric vehicle in an upper direction and a lower direction.

Figure 9:
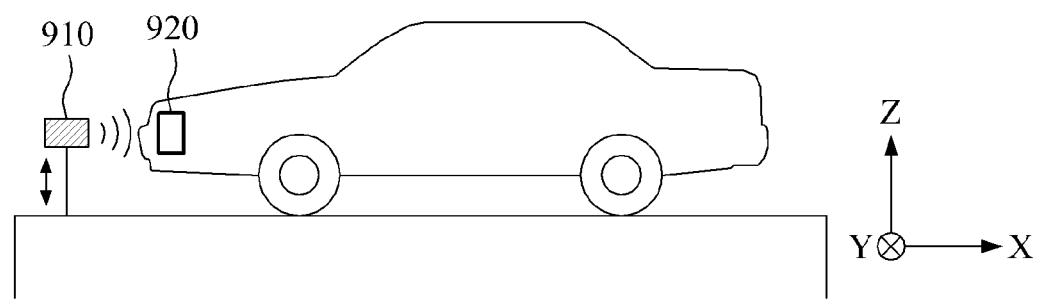

Referring to FIG. 9, an electric vehicle includes a portable target resonator 920 mounted on a front bumper of the electric vehicle. A source resonator may be mounted in a stand 910 provided in a direction vertical to a bottom platform of a charging unit. A height of the stand 910 may be adjusted for the source resonator to be aligned with the portable target resonator 920. Since a position of the portable target resonator 920 may differ based on a type of the electric vehicle, a position of the stand 910 may be adjusted for the source resonator to be aligned with the portable target resonator 920.

In FIG. 9, the stand 910 including the source resonator may stand at a height greater than a predetermined height in a Z-axial direction, and the portable target resonator 920 may be mounted on the front bumper of the electric vehicle. The portable target resonator 920 may be disposed on one of inner, upper, and lower surfaces of the front bumper of the electric vehicle. For example, the portable target resonator 920 may be installed within 20 cm from the front bumper of the electric vehicle in an upper direction and a lower direction.

While FIG. 9 illustrates a source resonator paired to a portable target resonator disposed in the front of the electric vehicle, in another example, the source resonator may be also paired to a portable target resonator disposed on either sides of the electric vehicle.

Figure 10:
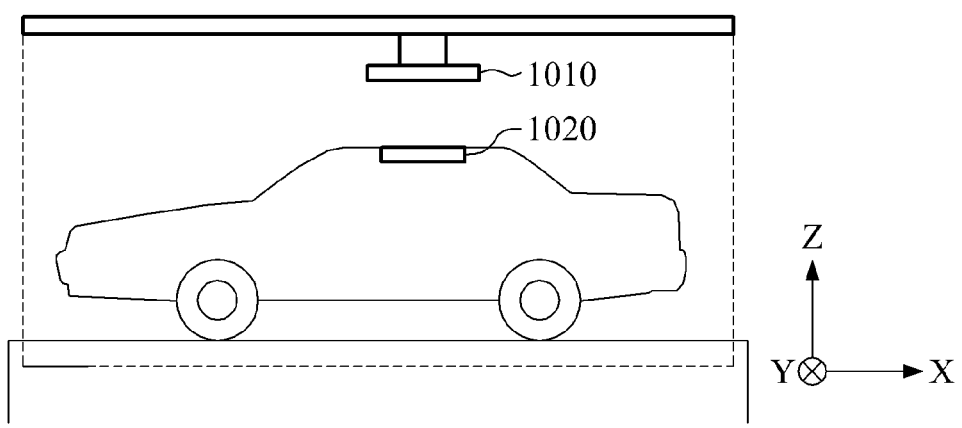

Referring to FIG. 10, a charging unit includes a source resonator 1010 at a height greater than an overall height of an electric vehicle. The electric vehicle includes a portable target resonator 1020 mounted in an upper portion of a roof of the electric vehicle.

For efficient wireless power transmission, a distance between the source resonator 1010 and the portable target resonator 1020, an alignment on X and Y axes, and the like may be determined based on a size of the source resonator 1010, a size of the portable target resonator 1020, a frequency, and the like. For example, the charging unit may be configured such that the distance between the source resonator 1010 and the top of the electric vehicle may be adjusted by moving the source resonator 1010 up and down.

FIG. 11 illustrates yet another example of a wireless power transmission and reception system 1100.

Referring to FIG. 11, the system 1100 includes a railway vehicle 1130 and a charging station that includes a charging unit 1110 and a driving unit 1120. In this example, the railway vehicle 1130 is an example of an electric vehicle that maybe power in part or whole through electric power.

The charging unit 1110 may transmit power wirelessly, through a source resonator installed on a rail 1140, to a target resonator that mutually resonates with the source resonator at a resonant frequency of the source resonator. For example, source resonators may be installed in predetermined positions of the rail 1140. The predetermined positions of the rail 1140 may be a charging station of the railway vehicle 1130.

The driving unit 1120 may move the target resonator to an installation space of the railway vehicle 1130 when the railway vehicle 1130 is disposed in a charging area of the charging unit 1110. The charging area may be defined as an area in which power may be transferred from the source resonator installed on the charging unit 110.

The railway vehicle 1130 may be configured to have a space for mounting the target resonator. The driving unit 1120 may move the target resonator from a position at which the target resonator is mounted on the charging station 1110 to the installation space of the railway vehicle 1130. The driving unit 1120 may connect the source resonator and the target resonator, and support the connection between the source resonator and the target resonator.

For example, the driving unit 1120 may adjust a height of the driving unit 1120, thereby adjusting a distance between the source resonator and the target resonator. The height of the driving unit 1120 may be adjusted based on a distance between the charging station 1110 and a bottom surface of the railway vehicle 1130. In this example, allowances may be made for a size of the source resonator and a size of the target resonator in determining the distance between the source resonator and the target resonator.

The driving unit 1120 includes a distance controller 1121 and a connector 1123. The distance controller 1121 may control a physical distance between the source resonator and the target resonator, and the connector 1123 may connect the source resonator and the target resonator at a distance determined based a control of the distance controller 1121.

The railway vehicle 1130 may be charged using power received by the target resonator when the target resonator is disposed in the installation space of the railway vehicle 1130. In a railway vehicle 1130 that includes a battery, the railway vehicle 1130 may store the power received by the target resonator in the battery.

When a separate target resonator is not installed in an electric vehicle, a target resonator mounted on a charging station may be used to increase a fuel efficiency of the electric vehicle. By using a target resonator well-matched to a source resonator of the charging station, a power transmission efficiency may be increased.

By mounting a portable target resonator at a position spaced more than 10 cm from wheels of the electric vehicle, a leakage field occurring in a direction of an external portion of the electric vehicle may be minimized during a charging of the electric vehicle.

By mounting a portable target resonator on an axis connecting wheels of an electric vehicle and a source resonator of a charging station, based on a position of a wheel stop of the charging station, an amount of time and energy used for an alignment between the source resonator and the portable target resonator may be minimized.

By adjusting a height of a stand in a Z-axial direction to adjust a position of a source resonator, impedance matching may be optimized at a position of a target resonator mounted in an electric vehicle or a railway vehicle.

By mounting a portable target resonator on a roof an electric vehicle or a railway vehicle, when a source resonator of a charging station is disposed at a height greater than an overall height of the electric vehicle or the railway vehicle, a distance between the source resonator and the portable target resonator may be reduced, whereby a power transmission efficiency may be increased.

Hereinafter, the term "resonator" with respect to FIGS. 12A through 14B may refer to, for example, a source resonator and a target resonator. The resonators illustrated in or discussed with respect to FIGS. 1 through 11 may be configured to have the structure of the resonators illustrated in FIGS. 12A through 14B.

Figure 12A:
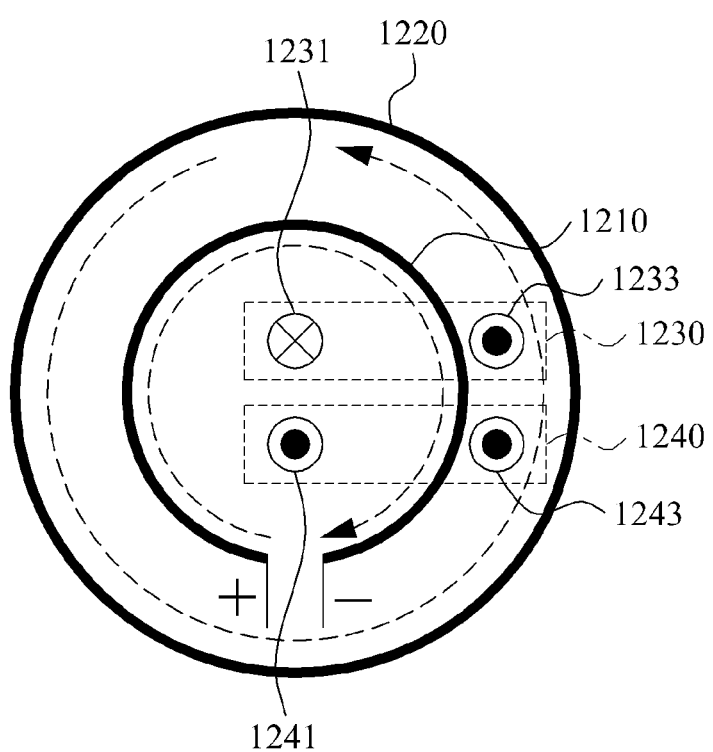
FIG. 12A is a diagram illustrating distribution of a magnetic field in an example of a feeder.

FIG. 12A illustrates the distribution of magnetic field in an example of a feeder. FIG. 12B illustrates the distribution of magnetic field in an example of a resonator.

When a resonator receives power supplied through a separate feeder, magnetic fields may form in both the feeder and the resonator.

The source resonator and the target resonator may have a dual loop structure including an external loop and an internal loop.

Referring to FIG. 12A, a magnetic field 1230 may be formed as input current flows into a feeder 1210. A direction 1231 of the magnetic field 1230 within the feeder 1210 may be opposite to a direction 1233 of the magnetic field 1230 outside the feeder 1210. The magnetic field 1230 formed by the feeder 1210 may induce current to form in a resonator 1220. The direction of the induced current may be opposite to a direction of the input current.

Due to the induced current, a magnetic field 1240 may form in the resonator 1220. Directions of a magnetic field formed due to induced current in all positions of the resonator 1220 may be the same. Accordingly, a direction 1241 of the magnetic field 1240 formed by the resonator 1220 may be identical to a direction 1243 of the magnetic field 1240 formed by the resonator 1220.

Thus, when the magnetic field 1230 formed by the feeder 1210 and the magnetic field 1240 formed by the resonator 1220 are combined, strength of the total magnetic field may decrease within the feeder 1210 while the strength of the magnetic field may increase outside the feeder 1210. In an example in which power is supplied to the resonator 1220 through the feeder 1210 configured as illustrated in FIG. 12A, the strength of the total magnetic field may decrease in the center of the resonator 1220, but may increase outside the resonator 1220. In another example in which a magnetic field is randomly distributed in the resonator 1220, it may be difficult to perform impedance matching because an input impedance may frequently vary. Additionally, when the strength of the total magnetic field is increased, an efficiency of wireless power transmission may be increased. Conversely, when the strength of the total magnetic field is decreased, the efficiency for wireless power transmission may be reduced. Accordingly, the power transmission efficiency may be reduced on average.

FIG. 12B illustrates an example of a wireless power transmission apparatus in which a resonator 1250 and a feeder 1260 have a common ground. The resonator 1250 includes a capacitor 1251. The feeder 1260 may receive an input of a radio frequency (RF) signal via a port 1261.

For example, when the RF signal is input to the feeder 1260, input current may be generated in the feeder 1260. The input current flowing in the feeder 1260 may cause a magnetic field to form, and the magnetic field may induce a current in the resonator 1250. Additionally, another magnetic field may form due to the induced current flowing in the resonator 1250. In this example, a direction of the input current flowing in the feeder 1260 may have a phase opposite to a phase of a direction of the induced current flowing in the resonator 1250. Accordingly, in a region between the resonator 1250 and the feeder 1260, a direction 1271 of the magnetic field formed due to the input current may have the same phase as a direction 1273 of the magnetic field formed due to the induced current; thus, the strength of the total magnetic field may increase. Conversely, within the feeder 1260, a direction 1281 of the magnetic field formed due to the input current may have a phase opposite to a phase of a direction 1283 of the magnetic field formed due to the induced current, and thus the strength of the total magnetic field may decrease. Therefore, the strength of the total magnetic field may decrease in the center of the resonator 1250, but may increase outside the resonator 1250.

The feeder 1260 may determine an input impedance by adjusting an internal area of the feeder 1260. The input impedance refers to an impedance determined in a direction from the feeder 1260 to the resonator 1250. When the internal area of the feeder 1260 is increased, the input impedance may increase. Conversely, when the internal area of the feeder 1260 is reduced, the input impedance may decrease. Because the magnetic field is randomly distributed in the resonator 1250 despite a reduction in the input impedance, a value of the input impedance may vary based on a location of a target device. Accordingly, a separate matching network may be required to match the input impedance to an output impedance of a power amplifier. For example, when the input impedance is increased, a separate matching network may be used to match the increased input impedance to a relatively low output impedance.

Figure 13A:
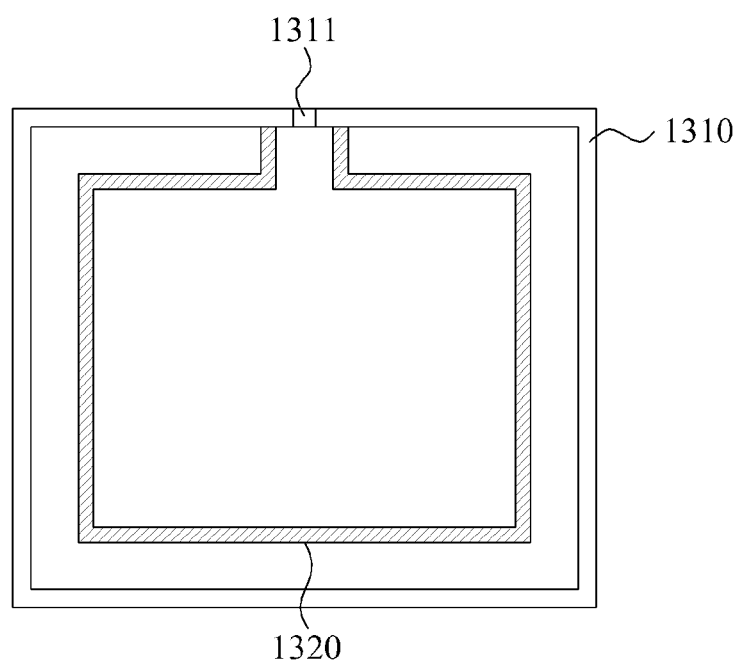
FIGS. 13A and 13B are diagrams illustrating an example of a wireless power transmission apparatus.

FIG. 13A illustrates an example of a wireless power transmission apparatus.

Referring to FIG. 13A, the wireless power transmission apparatus includes a resonator 1310 and a feeding unit 1320. The resonator 1310 may further include a capacitor 1311. The feeding unit 1320 may be electrically connected to both ends of the capacitor 1311.

Figure 13B:
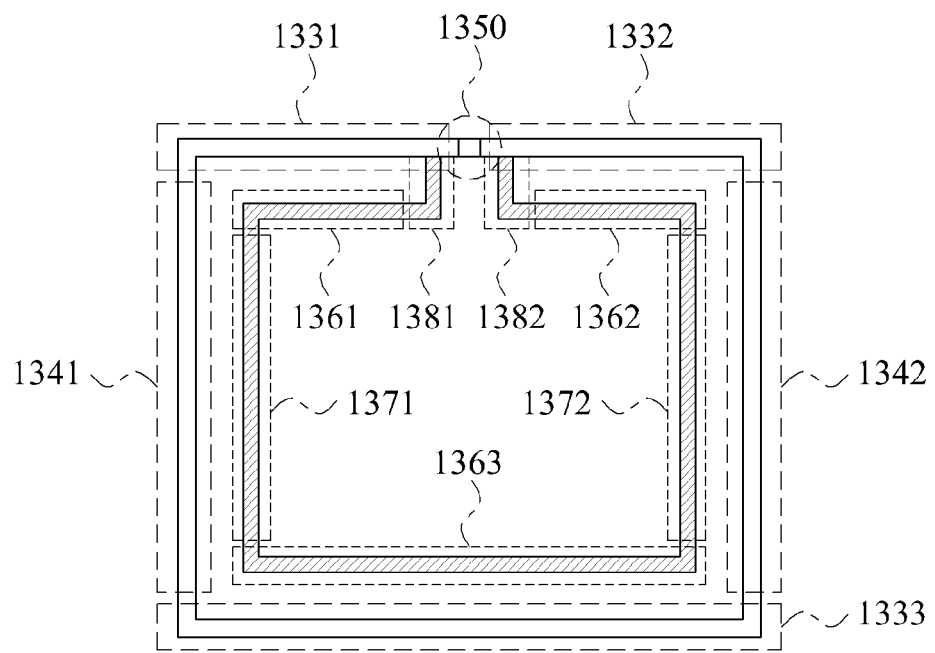

FIG. 13B further illustrates the wireless power transmission apparatus of FIG. 13A. The resonator 1310 may include a first transmission line, a first conductor 1341, a second conductor 1342, and at least one first capacitor 1350.

The first capacitor 1350 may be inserted in series between a first signal conducting portion 1331 and a second signal conducting portion 1332 in the first transmission line, and an electric field may be confined within the first capacitor 1350. For example, the first transmission line may include at least one conductor in an upper portion of the first transmission line, and may also include at least one conductor in a lower portion of the first transmission line. Current may flow through the at least one conductor disposed in the upper portion of the first transmission line. The at least one conductor disposed in the lower portion of the first transmission line may be electrically grounded. For example, a conductor disposed in an upper portion of the first transmission line may be separated into and referred to as the first signal conducting portion 1331 and the second signal conducting portion 1332. A conductor disposed in a lower portion of the first transmission line may be referred to as a first ground conducting portion 1333.

Referring to FIG. 13B, the resonator 1310 may have a substantially two-dimensional (2D) structure. The first transmission line may include the first signal conducting portion 1331 and the second signal conducting portion 1332 in the upper portion of the first transmission line. In addition, the first transmission line may include the first ground conducting portion 1333 in the lower portion of the first transmission line. The first signal conducting portion 1331 and the second signal conducting portion 1332 may face the first ground conducting portion 1333. Current may flow through the first signal conducting portion 1331 and the second signal conducting portion 1332.

Additionally, one end of the first signal conducting portion 1331 may be electrically connected (i.e., shorted) to the first conductor 1341, and another end of the first signal conducting portion 1331 may be connected to the first capacitor 1350. One end of the second signal conducting portion 1332 may be shorted to the second conductor 1342, and another end of the second signal conducting portion 1332 may be connected to the first capacitor 1350. Accordingly, the first signal conducting portion 1331, the second signal conducting portion 1332, the first ground conducting portion 1333, and the conductors 1341 and 1342 may be connected to each other, so that the resonator 1310 may have an electrically closed-loop structure. The term "loop structure" may include, for example, a polygonal structure such as a rectangular structure, octagonal structure and the like, and partially or entirely round structure such as a circular structure, an elliptical structure and the like. However, the shape of a loop structure is not limited thereto. The expression "having a loop structure" may indicate that the circuit is electrically closed.

The first capacitor 1350 may be inserted into an intermediate portion of the first transmission line. For example, the first capacitor 1350 may be inserted into a space between the first signal conducting portion 1331 and the second signal conducting portion 1332. The first capacitor 1350 may be configured as a lumped element, a distributed element, and the like. For example, a capacitor configured as a distributed element may include zigzagged conductor lines and a dielectric material that has a high permittivity positioned between the zigzagged conductor lines.

When the first capacitor 1350 is inserted into the first transmission line, the resonator 1310 may have a characteristic of a metamaterial. A metamaterial refers to a material having a predetermined electrical property that is not generally found in nature, but rather has an artificially designed structure. An electromagnetic characteristic of the materials existing in nature may have a unique magnetic permeability or a unique permittivity. Most materials may have a positive magnetic permeability or a positive permittivity.

In the case of most materials found in nature, a right hand rule may be applied to an electric field, a magnetic field, and a pointing vector; thus, the corresponding materials are referred to as right handed materials (RHMs). However, a metamaterial has a magnetic permeability or a permittivity absent in nature, and may be classified into an epsilon negative (ENG) material, a mu negative (MNG) material, a double negative (DNG) material, a negative refractive index (NRI) material, a left-handed (LH) material, and the like, based on a sign of the corresponding permittivity or magnetic permeability.

When a capacitance of the first capacitor 1350 inserted as the lumped element is appropriately set, the resonator 1310 may have the characteristic of the metamaterial. Because the resonator 1310 may have a negative magnetic permeability by appropriately adjusting the capacitance of the first capacitor 1350, the resonator 1310 may also be referred to as an MNG resonator. Various criteria may be applied to determine the amount of capacitance of the first capacitor 1350. For example, the various criteria may include a criterion for enabling the resonator 1310 to have the characteristic of the metamaterial, a criterion for enabling the resonator 1310 to have a negative magnetic permeability in a target frequency, a criterion for enabling the resonator 1310 to have a zeroth order resonance characteristic in the target frequency, and the like. Based on at least one criterion among the aforementioned criteria, the capacitance of the first capacitor 1350 to be used may be determined.

The resonator 1310, also referred to as the MNG resonator 1310, may have a zeroth order resonance characteristic of having, as a resonance frequency, a frequency when a propagation constant is "0". Because the resonator 1310 may have a zeroth order resonance characteristic, the resonance frequency may be independent with respect to a physical size of the MNG resonator 1310. By appropriately designing or determining the configuration of the first capacitor 1350, the MNG resonator 1310 may sufficiently change the resonance frequency without changing the physical size of the MNG resonator 1310.

In a near field, for instance, the electric field may be concentrated on the first capacitor 1350 inserted into the first transmission line. Accordingly, due to the first capacitor 1350, the magnetic field may become dominant in the near field. The MNG resonator 1310 may have a relatively high Q-argument using the first capacitor 1350 of the lumped element; thus, it may be possible to enhance an efficiency of power transmission. For example, the Q-argument may indicate a level of an ohmic loss or a ratio of a reactance with respect to a resistance in the wireless power transmission. The efficiency of the wireless power transmission may increase according to an increase in the Q-argument.

Although not illustrated in FIG. 13B, a magnetic core may be further provided to pass through the MNG resonator 1310. The magnetic core may perform a function of increasing a power transmission distance.

Referring to FIG. 13B, the feeding unit 1320 may include a second transmission line, a third conductor 1371, a fourth conductor 1372, a fifth conductor 1381, and a sixth conductor 1382.

The second transmission line may include a third signal conducting portion 1361 and a fourth signal conducting portion 1362 in an upper portion of the second transmission line. In addition, the second transmission line may include a second ground conducting portion 1363 in a lower portion of the second transmission line. The third signal conducting portion 1361 and the fourth signal conducting portion 1362 may face the second ground conducting portion 1363. Current may flow through the third signal conducting portion 1361 and the fourth signal conducting portion 1362.

Additionally, one end of the third signal conducting portion 1361 may be shorted to the third conductor 1371, and another end of the third signal conducting portion 1361 may be connected to the fifth conductor 1381. One end of the fourth signal conducting portion 1362 may be shorted to the fourth conductor 1372, and another end of the fourth signal conducting portion 1362 may be connected to the sixth conductor 1382. The fifth conductor 1381 may be connected to the first signal conducting portion 1331, and the sixth conductor 1382 may be connected to the second signal conducting portion 1332. The fifth conductor 1381 and the sixth conductor 1382 may be connected in parallel to both ends of the first capacitor 1350. In this example, the fifth conductor 1381 and the sixth conductor 1382 may be used as input ports to receive an RF signal as an input.

Accordingly, the third signal conducting portion 1361, the fourth signal conducting portion 1362, the second ground conducting portion 1363, the third conductor 1371, the fourth conductor 1372, the fifth conductor 1381, the sixth conductor 1382, and the resonator 1310 may be connected to each other, so that the resonator 1310 and the feeding unit 1320 may have an electrically closed-loop structure. The term "loop structure" may include, for example, a polygonal structure such as a rectangular structure, an octagonal structure and the like, or a partially or fully curved structure such as a circular structure, an elliptical structure and the like. When an RF signal is received via the fifth conductor 1381 or the sixth conductor 1382, input current may flow in the feeding unit 1320 and the resonator 1310, a magnetic field may form due to the input current. The magnetic field may generate a current in the resonator 1310 by the induction. A direction of the input current flowing in the feeding unit 1320 may be the same as a direction of the induced current flowing in the resonator 1310. Thus, strength of the total magnetic field may increase in the center of the resonator 1310, but may decrease outside the resonator 1310.

An input impedance may be determined based on an area of a region between the resonator 1310 and the feeding unit 1320; accordingly, a separate matching network used to match the input impedance to an output impedance of a power amplifier may not be required. For example, even when the matching network is used, the input impedance may be to determined by adjusting a size of the feeding unit 1320; thus, a structure of the matching network may be portable. The portable structure of the matching network may minimize a matching loss of the matching network.

The second transmission line, the third conductor 1371, the fourth conductor 1372, the fifth conductor 1381, and the sixth conductor 1382 may form the same structure as the resonator 1310. In an example in which the resonator 1310 has a loop structure, the feeding unit 1320 may also have a loop structure. In another example in which the resonator 1310 has a circular structure, the feeding unit 1320 may also have a circular structure.

FIG. 14A illustrates the distribution of a magnetic field within a resonator based on the feeding of a feeding unit.

Figure 14B:
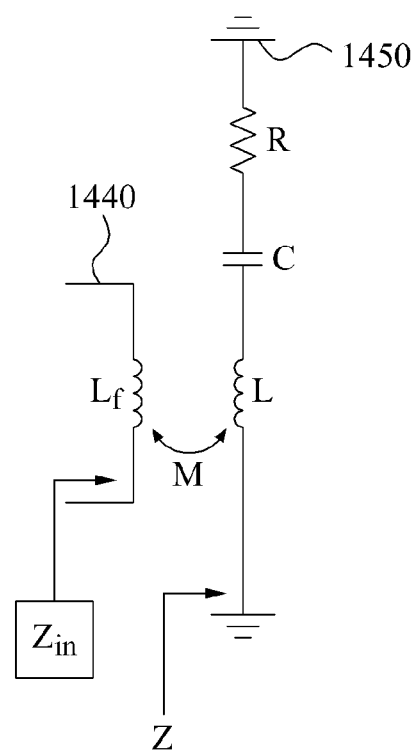
FIG. 14B is a diagram illustrating examples of equivalent circuits of a feeding unit and a resonator.

A feeding operation may refer to the supplying of power to a source resonator in wireless power transmission, or may refer to the supplying of AC power to a rectification unit in wireless power transmission. FIG. 14A illustrates a direction of input current flowing in the feeding unit, and a direction of induced current induced in the source resonator. Additionally, FIG. 14A illustrates a direction of a magnetic field formed due to the input current of the feeding unit, and a direction of a magnetic field formed due to the induced current of the source resonator. For example, FIG. 14A more briefly illustrates the resonator 1310 and the feeding unit 1320 of FIG. 13A, and FIG. 14B illustrates equivalent circuits of the feeding unit 1320 and the resonator 1310.

Referring to FIG. 14A, the fifth conductor 1381 or the sixth conductor 1382 of the feeding unit 1320 of FIG. 13A may be used as an input port 1410. The input port 1410 may receive an RF signal as an input. The RF signal may be output from a power amplifier. The power amplifier may increase or decrease an amplitude of the RF signal based on a demand by a target device. The RF signal received by the input port 1410 may be displayed in the form of input current flowing in the feeding unit 1320. The input current may flow in a clockwise direction in the feeding unit 1320, along a transmission line of the feeding unit to 1320. The fifth conductor 1381 of the feeding unit 1320 may be electrically connected to the resonator 1310. For example, the fifth conductor 1381 may be connected to a first signal conducting portion 1331 of the resonator 1310. Accordingly, the input current may flow in the resonator 1310, as well as, in the feeding unit 1320. The input current may flow in a counterclockwise direction in the resonator 1310. The input current flowing in the resonator 1310 may cause a magnetic field to form. The magnetic field may induce a current in the resonator 1310. The induced current may flow in a clockwise direction in the resonator 1310. For example, the induced current may transfer energy to the capacitor 1311 of the resonator 1310, and a magnetic field may form due to the induced current. In this example, the input current flowing in the feeding unit 1320 and the resonator 1310 of FIG. 13A is indicated by a solid line in FIG. 14A, and the induced current flowing in the resonator 1310 is indicated by a dotted line in FIG. 14A.

A direction of a magnetic field formed due to a current may be determined based on the right hand rule. Referring to FIG. 14A, within the feeding unit 1320, a direction 1421 of a magnetic field formed due to the input current flowing in the feeding unit 1320 may be identical to a direction 1423 of a magnetic field formed due to the induced current flowing in the resonator 1310. Accordingly, the strength of the total magnetic field may increase within the feeding unit 1320.

In a region between the feeding unit 1320 and the resonator 1310, a direction 1433 of a magnetic field formed due to the input current flowing in the feeding unit 1320 may be opposite to a direction 1431 of a magnetic field formed due to the induced current flowing in the resonator 1310. Accordingly, the strength of the total magnetic field may decrease in the region between the feeding unit 1320 and the resonator 1310.

In general, a strength of a magnetic field decreases in the center of a resonator with the loop structure, and increases outside the resonator. However, referring to FIG. 14A, the feeding unit 1320 may be electrically connected to both ends of the capacitor 1311 of the resonator 1310, and accordingly the induced current of the resonator 1310 may flow in the same direction as the input current of the feeding unit 1320. Since the induced current of the resonator 1320 flows in the same direction as the input current of the feeding unit 1320, the strength of the total magnetic field may increase within the feeding unit 1320, and may decrease outside the feeding unit 1320. As a result, the strength of the total magnetic field may increase in the center of the resonator 1310 with the loop structure, and may decrease outside the resonator 1310, due to the feeding unit 1320. Thus, the strength of the total magnetic field may be equalized within the resonator 1310.

The power transmission efficiency for transferring a power from the source resonator to a target resonator may be in proportion to the strength of the total magnetic field formed in the resonator. In other words, when the strength of the total magnetic field increases in the center of the resonator, the power transmission efficiency may also increase.

Referring to FIG. 14B, the feeding unit 1440 and the resonator 1450 may be expressed as equivalent circuits. An example of an input impedance $Z_{in}$, viewed in a direction from the feeding unit 1440 to the resonator 1450 may be computed, as given in Equation 1.

$$Z_{in} = \frac{(\omega M)^2}{Z} \qquad \text{[Equation 1]}$$

In Equation 1, M denotes a mutual inductance between the feeding unit 1440 and the resonator 1450, ω denotes a resonance frequency between the feeding unit 1440 and the resonator 1450, and Z denotes an impedance viewed in a direction from the resonator 1450 to a target device. The input impedance $Z_{in}$ may be in proportion to the mutual inductance M. Accordingly, the input impedance $Z_{in}$ may be controlled by adjusting the mutual inductance M between the feeding unit 1440 and the resonator 1450. The mutual inductance M may be adjusted based on an area of a region between the feeding unit 1440 and the resonator 1450. The area of the region between the feeding unit 1440 and the resonator 1450 may be adjusted based on a size of the feeding unit 1440. Accordingly, the input impedance $Z_{in}$ may be determined based on the size of the feeding unit 1440, and thus a separate matching network may not be required to perform impedance matching with an output impedance of a power amplifier.

In the resonator 1450 and the feeding unit 1440 included in a wireless power reception apparatus, a magnetic field may be distributed as illustrated in FIG. 14A. The resonator 1450 may operate as a target resonator. For example, the target resonator may receive wireless power from a source resonator via magnetic coupling. Due to the received wireless power, induced current may be generated in the target resonator. A magnetic field formed due to the induced current in the target resonator may cause another induced current to be generated in the feeding unit 1440. In this example, when the resonator 1450 is connected to the feeding unit 1440 as illustrated in FIG. 14A, the induced current generated in the resonator 1450 may flow in the same direction as the induced current generated in the feeding unit 1440. Thus, the strength of the total magnetic field may increase within the feeding unit 1440, but may decrease in a region between the feeding unit 1440 and the resonator 1450.

Figure 15:
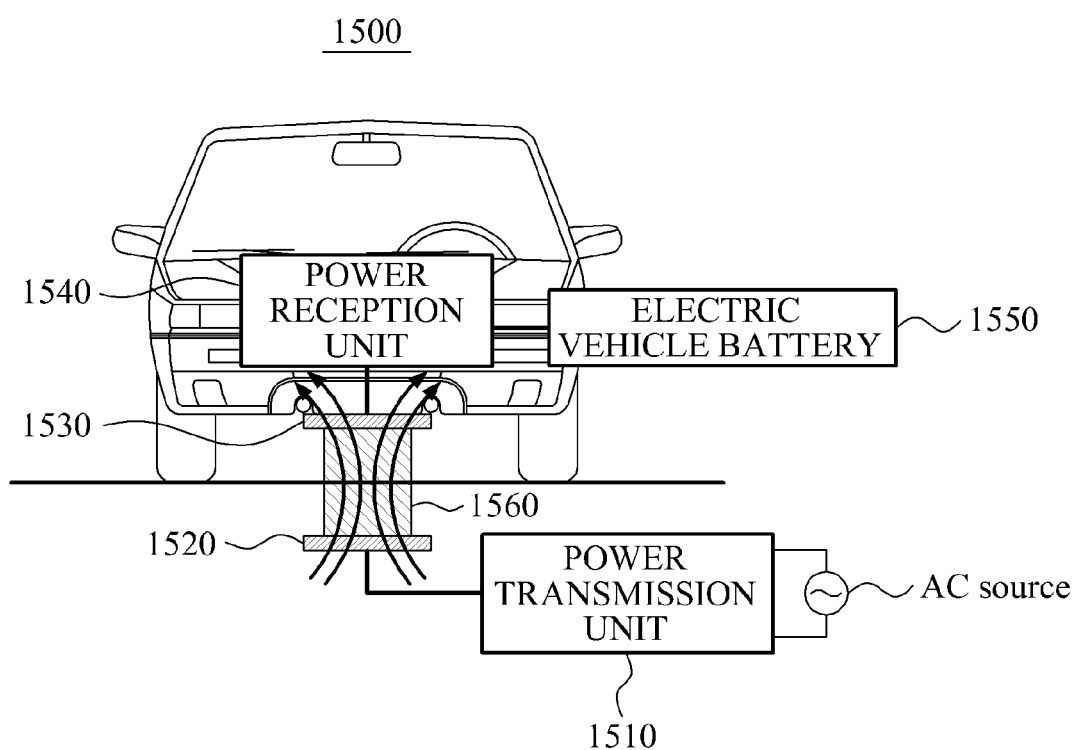
FIG. 15 is a diagram illustrating an example of an electric vehicle charging system.

FIG. 15 illustrates an example of an electric vehicle charging system.

Referring to FIG. 15, an electric vehicle charging system 1500 includes a power transmission unit 1510, a source resonator 1520, a target resonator 1530, a power reception unit 1540, and an electric vehicle battery 1550. The electric vehicle charging system 1500 may be include a wireless power charging station and a portion of an electronic vehicle.

The electric vehicle charging system 1500 may have a similar structure to the wireless power transmission control system illustrated in FIG. 4. The power transmission unit 1510 and the source resonator 1520 in the electric vehicle charging system 1500 may function as a source. The target resonator 1530 and the power reception unit 1540 in the electric vehicle charging system 1500 may function as a target.

The power transmission unit 1510 may include a variable SMPS, a matching network, a controller, and a communication unit, similar to the source 110 illustrated in FIG. 1. The power reception unit 1540 may include a matching network, a rectification unit, a DC/DC converter, a communication unit, and a controller, similar to the target 120 illustrated in FIG. 1.

The electric vehicle battery 1550 may be charged by the power reception unit 1540.

The electric vehicle charging system 1500 may use a resonant frequency in a range of a few kHz to tens of MHz.

The power transmission unit 1510 may generate power, based on a type of charging vehicle, a capacity of a battery, and a charging state of a battery, and may supply the generated power to the power reception unit 1540.

The power transmission unit 1510 may control the source resonator 1520 and the target resonator 1530 to be aligned. For example, when the source resonator 1520 and the target resonator 1530 are not aligned, the controller of the power transmission unit 1510 may transmit a message to the power reception unit 1540, and may control alignment between the source resonator 1520 and the target resonator 1530.

For example, when the target resonator 1530 is not located in a position enabling maximum magnetic resonance, the source resonator 1520 and the target resonator 1530 may not be aligned. When a vehicle does not stop accurately, the power transmission unit 1510 may induce a position of the vehicle to be adjusted, and may control the source resonator 1520 and the target resonator 1530 to be aligned. The source resonator 1520 may include a superconductive material. For example, the source resonator 1520 may be cooled through a refrigerant cooled by a cooling system.

The source resonator 1520 and the target resonator 1530 may be connected to a driving unit 1560. According to one example, the target resonator 1530 connected to the driving unit 1560 may not be mounted in an electric vehicle, and a configuration excluding the target resonator 1530 may be mounted in the electric vehicle. In this example, the driving unit 1560 and the target resonator 1530 may be included as parts of the charging station.

The power transmission unit 1510 and the power reception unit 1540 may transmit or receive an ID of a vehicle, or may exchange various messages, through communication.

The descriptions of wireless power transmission and reception system illustrated in FIGS. 2 through 14B may be applied to the electric vehicle charging system 1500. The electric vehicle charging system 1500 may use a resonant frequency in a range of a few kHz to tens of MHz, and may transmit power that is equal to or higher than tens of watts to charge the electric vehicle battery 1550.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or to some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. For example, the software and data may be stored by one or more non-transitory computer readable recording mediums.

The non-transitory computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, and optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wireless power charging station, comprising:
    a charging unit configured to transmit power wirelessly to an electric vehicle, using a source resonator installed in the charging station; and
    a driving unit configured to move a target resonator connected to the source resonator from a position at which the target resonator is mounted on the charging unit to an installation space of the electric vehicle, when the electric vehicle is disposed in a charging area of the charging station.

2. The charging station of claim 1, wherein the driving unit comprises:
    a distance controller configured to control a physical distance between the source resonator and the target resonator; and
    a connector configured to connect the source resonator and the target resonator at a distance determined by the distance controller.

3. The charging station of claim 2, wherein the connector is formed by a ferrite core, and is provided in a shape of a hollow cylinder.

4. The charging station of claim 2, wherein the distance controller is configured to recognize a distance from the source resonator to the installation space of the electric vehicle, and control the physical distance between the source resonator and the target resonator based on the recognized distance.

5. The charging station of claim 1, wherein:
    the source resonator comprises a superconductive material; and
    the charging unit comprises a cooler configured to cool the source resonator in order to maintain a superconductive property of the source resonator.

6. The charging station of claim 1, wherein the charging unit comprises:
    an alternating current-to-direct current (AC/DC) converter configured to convert an AC voltage output from a power supply into a DC voltage; and
    an inverter configured to convert the converted DC voltage into an AC voltage, using the resonant frequency.

7. The charging station of claim 1, wherein the driving unit is configured to connect the source resonator to a portable target resonator mounted on a bottom surface of the electric vehicle at a position located more than a predetermined distance away from a front tire and a rear tire of the electric vehicle.

8. The charging station of claim 1, wherein the driving unit is configured to connect the source resonator to a portable target resonator mounted on at least one of an axis connecting front wheels of the electric vehicle and an axis connecting rear wheels of the electric vehicle.

9. The charging station of claim 1, wherein the driving unit is configured to connect the source resonator to a portable target resonator mounted on at least one of a front bumper and a rear bumper of the electric vehicle.

10. The charging station of claim 1, wherein the source resonator is mounted in a stand provided in a direction vertical to a platform for positioning the electric vehicle, and a height of the stand allows the source resonator to be aligned with a portable target resonator mounted on the electric vehicle.

11. The charging station of claim 1, wherein:
    the charging unit comprises the source resonator at a height greater than a height of the electric vehicle, and
    the source resonator is configured to resonate with a portable target resonator mounted on a roof of the electric vehicle.

12. The charging station of claim 1, wherein the source resonator has a dual loop structure including an external loop and an internal loop.

13. An electric vehicle configured to be charged in the charging station of claim 1, wherein the electric vehicle comprises:
    a port unit configured to be electrically connected to the target resonator when the target resonator is disposed in the installation space; and
    a rectifier configured to convert an AC voltage induced in the target resonator into a DC voltage.

14. The electric vehicle of claim 13, wherein the electric vehicle further comprises:
    a DC-to-DC (DC/DC) converter configured to convert an amplitude of the converted DC voltage into an amplitude of a DC voltage necessary for charging the battery of the electric vehicle.

15. A wireless power charging station, comprising:
    a charging unit configured to transmit power wirelessly, through a source resonator installed on a rail, to a target resonator that mutually resonates with the source resonator at a resonant frequency of the source resonator; and a driving unit configured to move the target resonator connected to and supported by the source resonator from a position at which the target resonator is initially disposed in the charging station to an installation space of a railway vehicle, when the railway vehicle is disposed in a charging area of the charging station.

16. The charging station of claim 15, wherein the driving unit comprises:

a distance controller configured to control a physical distance between the source resonator and the target resonator; and a connector configured to connect the source resonator and the target resonator at a distance determined based on a control of the distance controller.

17. A method of charging an electric vehicle, the method comprising:

determining whether an electric vehicle is disposed in a charging station using a sensor;

positioning a source resonator or a target resonator based on a position of a power reception unit of the electric vehicle; and wirelessly transmitting power through the source resonator and the target resonator to charge an electric vehicle battery of the electric vehicle.

18. The method of claim 17, wherein the target resonator is a portable target resonator installed to a bottom surface of the electric vehicle; and the electric vehicle comprises an installation space via which the target resonator may receive power from the source resonator provided in the charging station.

19. The method of claim 17, wherein the positioning of the source resonator or the target resonator comprises using a wheel stop to halt the electric vehicle in a charging area.

20. The method of claim 17, wherein the wirelessly transmitting of power is performed while the temperature of the source resonator is maintained under 80 Kelvin.

* * * * *